Dec. 4, 1934.  F. L. SCOTT ET AL  1,983,316
THREE-CONE BIT
Filed April 17, 1933

F. L. SCOTT
L. E. GARFIELD   INVENTORS

BY Jesse R. Stone

ATTORNEY

Patented Dec. 4, 1934

1,983,316

UNITED STATES PATENT OFFICE 1,983,316

THREE-CONE BIT

Floyd L. Scott and Lewis E. Garfield, Houston, Tex., assignors to Hughes Tool Company, Houston, Tex., a corporation of Texas Application April 17, 1933, Serial No. 666,472

7 Claims. (Cl. 255—71)

The invention relates to well drills and more particularly to well drills having approximately conical shaped rolling cutters.

We have as an object to provide a bit of this character with three or more cutters in which the teeth on adjacent cutters may interfit in operation.

We aim also to form the teeth on adjacent cutters in offset relation so that the teeth on each cutter will cut a track on the bottom of the hole separate from the tracks of the teeth on adjacent cutters.

We desire to obtain long cutting teeth on each cutter by extending the teeth on each cutter laterally to overlap the teeth on adjacent cutters and to so cut the rows of teeth that they will not contact with the rows on adjacent cutters due to the springing of the shafts or wear of the cutter bushings.

It has heretofore been considered impossible and undesirable to form the teeth on the cutters of a three cone bit so that they may interfit in use, the reason being that it is difficult to make the rows of teeth on one cutter mate with the teeth of two other cutters, the teeth of which must also interfit with each other. We have found that this may be done, and although the rows of teeth on each cutter are necessarily few, by proper arrangement they will together cut the full bottom of the hole and provide a smooth running and fast cutting drill.

In the drawing herewith Fig. 1 is a central vertical section through a drill embodying our invention.

Figure 1:
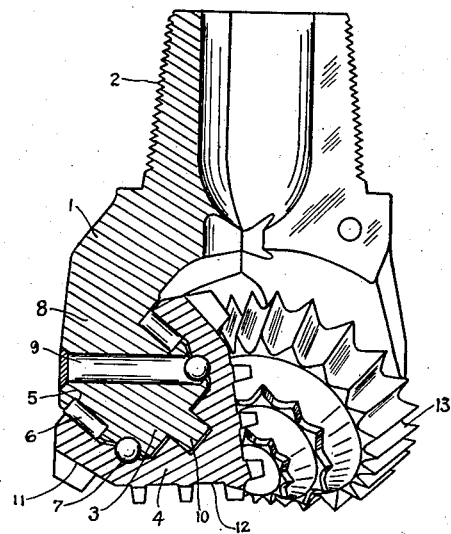

We have shown our invention as embodied in a three-cutter drill although it is to be understood that three or more cutters may be used. The said cutters are mounted on a head 1 having an upper tapered shank 2 threaded to engage with the drill collar. Said head 1 is divided longitudinally into three equal parts. Each section has a downwardly and inwardly inclined shaft 3 thereon to support one of the cutters 4.

The outer surface of each shaft forms a bearing for the cutter. We have shown the shaft as recessed adjacent the head to form a raceway 5, for a row of roller bearings 6. The shaft also has an annular groove to receive the ball bearings 7 which serve to hold the cutter on the shaft. These balls are inserted through a channel 8 through the shaft, said channel being then plugged by a cylindrical plug 9. The end 10 of the shaft is reduced to form a lateral thrust member in the cutter during operation.

The cutter is of approximately frusto-conical shape and is formed on its interior to fit upon the shaft and bearings as do cutters generally of this character. The outer surface, however, is formed with two conical tapers. The zone 11 adjacent the base merges into the zone 12, which comes to an apex at a much more obtuse angle than does the zone 11. The zone 11 is cut with a single row of teeth 13 which act to cut the outer circumference of the hole and maintain clearance for the drill.

Figure 2:
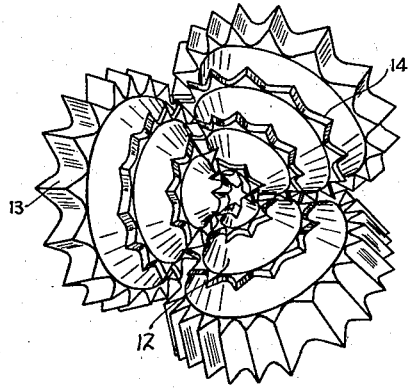
Fig. 2 is a bottom plan view of the drill.
Figure 3:
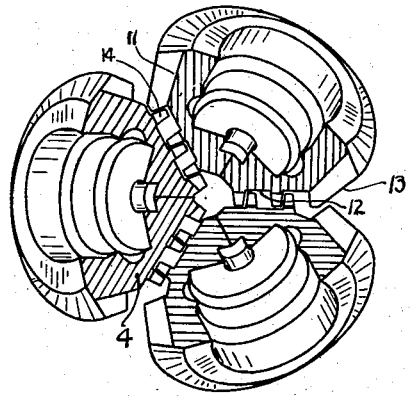
Fig. 3 is a top view of the drill with the cutters each in section on planes converging upwardly from the line of contact between the adjacent cutters.

The rows of teeth 14 along the zone 12 are formed to interfit with corresponding rows of teeth on adjacent cutters. This allows the formation of longer teeth because each row of teeth extends over on to the territory of the adjacent cutter across the plane where they would have to stop if it were not for the interfitting. The cutters are tapered at two separate angles and do not have a true rolling motion but tend to engage the formation with a twisting action which gives the teeth on each cutter a tendency to move outwardly from the center on their forward advancing sides. To provide for this, we form the rows of teeth on each cutter outwardly from the center relative to the corresponding rows on the adjacent preceding cutter during rotation of the drill. This will be noted from Figs. 2 and 3, where the drill rotates in the direction of the arrow.

Thus, as each cutter tends to twist on the bottom and move the teeth on its forward side outwardly and on its rearward side inwardly, the teeth on adjacent cones will move apart rather than towards each other under such strains.

It is to be noted that each row of teeth on each cutter cuts its own track on the bottom of the hole and that between them the rows of teeth on all the cutters cut the full bottom of the hole. Also, the arrangement of the teeth is such that the rows of teeth on each cutter except the outer row cuts tracks on the bottom of the hole that lie outside of the tracks cut by the corresponding rows of teeth on the preceding cutter.

By using more than two cutters upon the bit head, the bit drills more smoothly because of its superior support upon the well bottom. There is less vibration and a better cutting function due to the twisting action of the teeth on the formation.

We are thus enabled to obtain a fast cutting action and smooth operation, together with the penetration obtained from long teeth upon the cutters.

What we claim as new is:

1. A well drill comprising a head longitudinally divided into three sections, a threaded shank on said head, a downwardly and inwardly inclined cutter shaft on each section, cutters mounted on said shafts and enclosing the ends thereof, and teeth on said cutters interfitting between the teeth of adjacent cutters, whereby said teeth may be comparatively long and penetrating.

2. A well drill comprising a head longitudinally divided into three sections, a threaded shank on said head, a downwardly and inwardly inclined cutter shaft on each section, cutters mounted on said shafts and enclosing the ends thereof, said cutters being of approximately conical shape, teeth arranged on each cutter in circumferential rows offset relative to the rows of teeth on the adjacent cutters, said cutters arranged to rotate with said rows of teeth out of contact with the rows of teeth on adjacent cutters.

3. A well drill comprising a head, a threaded shank thereon, three downwardly and inwardly inclined cutter shafts on the lower end of said head, cutters surrounding and enclosing the ends of said shafts, bearings on said shafts for said cutters, and teeth in circumferential rows on said cutters offset longitudinally from the teeth on adjacent cutters, said rows of teeth on all the cutters together acting to cut the full bottom of the hole, but each row except the outer row cutting a separate path on said well bottom.

4. A well drill comprising a head, a threaded shank thereon, three downwardly and inwardly inclined cutter shafts on the lower end of said head, cutters surrounding and enclosing the ends of said shafts, bearings on said shafts for said cutters, and teeth in circumferential rows on said cutters offset longitudinally from the teeth on adjacent cutters, said rows of teeth on all the cutters together acting to cut the full bottom of the hole, but each row except the outer row cutting a separate path on said well bottom, the rows of teeth on each cutter during rotation being arranged outwardly beyond the adjacent rows of teeth on the preceding cutter.

5. A well drill including a head, more than two cutter shafts on said head, cutters enclosing the ends of said shafts and having bearings thereon, circumferential rows of teeth on said cutters, the said rows of teeth on each cutter inside the outer row being arranged outwardly relative to the adjacent rows on the cutter preceding it during rotation.

6. A well drill including a head, a set of three cutters of approximately conical shape mounted for rotation on the lower end thereof, teeth arranged in circumferential rows on each cutter, said teeth being adapted to interfit with the teeth of adjacent cutters in use, the corresponding row of teeth on each cutter except the outer row being arranged to cut a track on the well bottom outside the track cut by the preceding cutter during rotation.

7. A well drill, more than two approximately conical shaped cutters thereon, teeth in circumferential rows around said cutters, each row of teeth except the outer one being arranged to cut a separate track on the well bottom outside the track cut by the adjacent row of teeth on the preceding cutter during rotation.

FLOYD L. SCOTT.
LEWIS E. GARFIELD.